United States Patent [19]

Tabata et al.

[11] Patent Number: 4,618,991
[45] Date of Patent: Oct. 21, 1986

[54] PROCESSING METHOD FOR THE ROTATION OF AN IMAGE

[75] Inventors: Kuniaki Tabata, Nishitama; Haruo Takeda, Machida, both of Japan

[73] Assignee: Hitachi, Ltd., Tokyo, Japan

[21] Appl. No.: 613,189

[22] Filed: May 23, 1984

[30] Foreign Application Priority Data

May 23, 1983 [JP] Japan .................................. 58-89119
Nov. 2, 1983 [JP] Japan ................................ 58-204826

[51] Int. Cl.$^4$ ............................................. G06K 9/32
[52] U.S. Cl. .................................... 382/46; 340/727; 364/731
[58] Field of Search ......................... 382/46; 340/727; 358/22; 364/731

[56] References Cited

U.S. PATENT DOCUMENTS 3,811,110 5/1974 Inose et al. ............................ 382/46
4,468,688 8/1984 Gabriel et al. ........................ 358/22

*Primary Examiner*—David K. Moore
*Assistant Examiner*—Jacqueline Todd
*Attorney, Agent, or Firm*—Antonelli, Terry & Wands

[57] ABSTRACT

A signal rotation processing method for transforming an original image expressed on two-dimensional orthogonal coordinates into an image rotated by an arbitrary angle of $\theta$ radians. In order to raise the transforming speed, the method includes a skew coordinate transformation step of multiplying the original coordinates of the image elements by a matrix of $$\begin{pmatrix} 1 & -\tan\theta \\ 0 & 1 \end{pmatrix} \text{ or } \begin{pmatrix} 1 & 0 \\ \tan\theta & 1 \end{pmatrix},$$

and an enlarging/reducing transformation step of conducting multiplication by a matrix of $$\begin{pmatrix} \cos\theta & 0 \\ 0 & \sec\theta \end{pmatrix}.$$

8 Claims, 8 Drawing Figures

PROCESSING METHOD FOR THE ROTATION OF AN IMAGE

BACKGROUND OF THE INVENTION (1) Field of the Invention

The present invention relates to an image rotation processing method and, more particularly, to a signal processing method for transforming an image represented on two-dimentional orthogonal coordinates into an image rotated by an arbitrary angle, that is to say, a high-speed processing method which is suitable for editing documents including images and for matching seal impressions.

(2) Description of the Prior Art

Consideration will be taken into the process of rotating a digital image, which is defined as a set of image elements in an orthogonal lattice, by an angle of $\theta$ radians. The image rotation is a kind of affine transformations and is defined by the following equation:

$$\begin{pmatrix} u \\ v \end{pmatrix} = \begin{pmatrix} \cos\theta & -\sin\theta \\ \sin\theta & \cos\theta \end{pmatrix} \begin{pmatrix} x \\ y \end{pmatrix}, \tag{1}$$

wherein $$\begin{pmatrix} x \\ y \end{pmatrix}$$

designates the image element coordinates of an original image, and $$\begin{pmatrix} u \\ v \end{pmatrix}$$

designates the image element coordinates of the rotated image.

The image rotation method of the prior systems generally repeats the coordinate transformations of the Equation (1) for each image element and finds it difficult to conduct the rotations at a high speed. (for example, the methods disclosed in: (1) Japanese Patent Application Laid-Open No. 57-117061; (2) Literature Study Papers IE 78-12 by the Institute of Electronics and Communication Engineers of Japan; and (3) Computer, IEEE, p.p. 24–26, June 1983) We, the inventors, have invented an image rotation method (Japanese Patent Application No. 57-176151) for transferring adjoining image elements as a whole. This method can have an arbitrary angle of rotation but has a defect in that its processing time depends upon the rotational angle such that it takes the maximum for the rotation of $(2n-1)\times\pi/4$ radians ($1\leq n\leq 4$).

SUMMARY OF THE INVENTION

An object of the present invention is to provide means for realizing an image rotation of an arbitrary angle $\theta$ ($-\pi\leq\theta\leq\pi$) at a high speed.

In order to achieve the above object, according to the present invention, an image is rotated by a step of transforming the two-dimentional orthogonal coordinates of the image elements of an original image into skew coordinates making an intersectional angle $\theta$ (radians), and by a step of conducting the coordinate transformations substantially of $\cos\theta$ (or $\sin\theta$) in the direction of one axis of said two-dimentional orthogonal coordinates and substantially of $\sin\theta$ (or $\cos\theta$) in the other direction.

If the following substitutions are made:

$$T_1 = \begin{pmatrix} 1 & -\tan\theta \\ 0 & 1 \end{pmatrix}; T_2 = \begin{pmatrix} \cos\theta & 0 \\ 0 & \sec\theta \end{pmatrix}; \text{ and } T_3 = \begin{pmatrix} 1 & 0 \\ \tan\theta & 1 \end{pmatrix},$$

the Equation (1) can be reformed into the following Equation:

$$\begin{pmatrix} u \\ v \end{pmatrix} = T_3 \times T_2 \times T_1 \times \begin{pmatrix} x \\ y \end{pmatrix}, \tag{2}$$

wherein: the matrices $T_1$ and $T_3$ designate the converted matrices for the skew coordinate transformation; and the matrix $T_2$ designates the converted matrix for enlargement/reduction. As a result, an image rotated by the angle $\theta$ is obtained by processing the original image for the skew coordinate transformation ($T_1$), the enlargement/reduction ($T_2$) and the skew coordinate transformation ($T_3$). Of these, the skew coordinate transformations ($T_1$ and $T_3$) are so simply processed that they can be executed at a high speed by the method of block transfer. For the enlargement/reduction ($T_2$), on the other hand, there has been provided the "method of and apparatus for enlarging/reducing two-dimensional images (U.S. patent application Ser. No. 489,350) which was invented by the, present inventors. As has been described in the above, the present invention is characterized in that the image rotation is speeded up by combining the skew coordinate transformation and the enlargement/reduction.

However, the matrices $T_2$ and $T_3$ in the Equation (2) cannot be defined because $|\tan\theta|\to\infty$ and $|\sec\theta|\to\infty$ for $\theta\leq\pm\pi/2$. With the increases in the $|\tan\theta|$ and sec $\theta$, moreover, it becomes more difficult to realize the skew transformation ($T_3$) and the enlargement/reduction ($T_2$). This difficulty can be eliminated by selecting the combinations of the skew transformations and the enlargement/reduction in the following manner in accordance with the range of the rotational angle $\theta$.

$-\pi/4 \leq \theta < \pi/4$, $3\pi/4 \leq \theta < \pi$, and $-\pi \leq \theta < -3\pi/4$: (a)

$$T_1 = \begin{pmatrix} 1 & -\tan\theta \\ 0 & 1 \end{pmatrix}; T_2 = \begin{pmatrix} \cos\theta & 0 \\ 0 & \sec\theta \end{pmatrix}; \text{ and } T_3 = \begin{pmatrix} 1 & 0 \\ \tan\theta & 1 \end{pmatrix}.$$

At this time, the individual components of the convered matrix have the following ranges:

$0\leq|\tan\theta|\leq 1$; $1/\sqrt{2}\leq|\cos\theta|\leq 1$; and $1\leq|\sec\theta|\leq\sqrt{2}$.

(b) $\pi/4\leq\theta<3\pi/4$, and $-3\pi/4\leq\theta<-\pi 4$:

$$T_1 = \begin{pmatrix} \cot\theta & -1 \\ 1 & 0 \end{pmatrix}; T_2 = \begin{pmatrix} \sin\theta & 0 \\ 0 & \csc\theta \end{pmatrix}; \text{ and}$$

$$T_3 = \begin{pmatrix} 1 & 0 \\ -\cot\theta & 1 \end{pmatrix}.$$

At this time, the individual components of the convered matrix have the following ranges:

$0 \leq |\cot\theta| \leq 1$; $1/\sqrt{2} \leq |\sin\theta| \leq 1$; and $1 \leq |\cosec\theta| \leq \sqrt{2}$.

As has already been known to the art, there has been established a technique for obtaining a high-quality image enlarged or reduced by a magnification of $1/\sqrt{2}$ to $\sqrt{2}$ (e.g., The 13th Image Engineering Conference p. 183–186, 1982 Dec.). As a result, the problem of deterioration in the image quality can be solved by selecting the combination of the converted matrices in accordance with the range of the rotational angle $\theta$, as has been described in the above.

When the rotational angle $\theta$ is expressed by $(2n-1) \times \pi/4$ (radians), i.e., $\theta = \pi/4$, $\theta = \frac{3}{4}\pi$, $\theta = 5/4\pi (= -\frac{3}{4}\pi)$, and $\theta = 7/4\pi (= -\pi/4)$, the matrices $T_1$ and $T_3$ are represented by $$\begin{pmatrix} 1 & -1 \\ 0 & 1 \end{pmatrix}, \begin{pmatrix} 1 & 0 \\ 1 & 1 \end{pmatrix}; \begin{pmatrix} 1 & 0 \\ -1 & 1 \end{pmatrix}, \begin{pmatrix} -1 & -1 \\ 0 & -1 \end{pmatrix}; \begin{pmatrix} 1 & 0 \\ 1 & 1 \end{pmatrix},$$

$$\begin{pmatrix} -1 & 1 \\ 0 & -1 \end{pmatrix}; \text{and} \begin{pmatrix} 1 & 0 \\ -1 & 1 \end{pmatrix}, \begin{pmatrix} 1 & 1 \\ 0 & 1 \end{pmatrix}$$

so that the processings for the skew transformations can be simplified and conducted at a high speed.

The above-mentioned and other features and objects of the present invention will become more apparent by reference to the following description taken in conjunction with the accompanying drawings.

DESCRIPTION OF THE PREFERRED EMBODIMENTS

Figure 1:
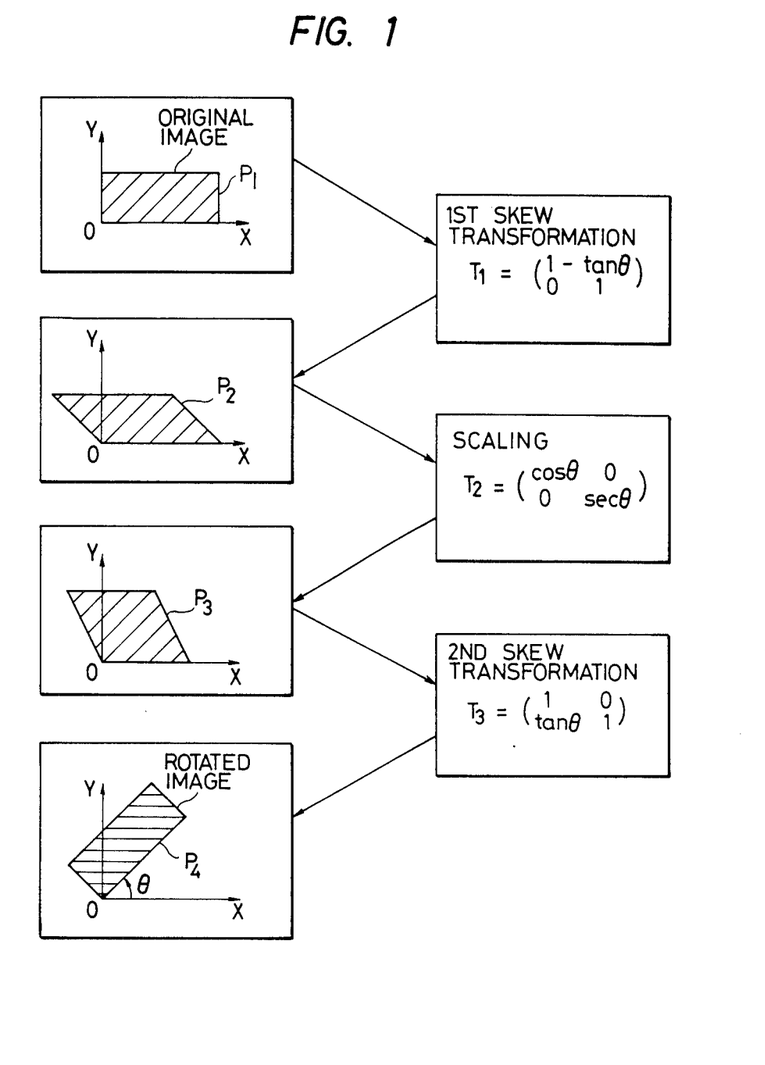
FIG. 1 is a diagram conceptionally explaining the relationships between signal processing steps of the present invention.

FIG. 1 conceptionally shows both the steps of the image rotation processing method of the present invention and the changes in the images at the individual steps so as to explain the principle of the present invention.

The following description is directed to the case where an original image $P_1$ having a rectangular shape is turned counter-clockwise by an angle of $\theta$ (radian) with respect to the center of rotation of point O to produce a rotated image $P_4$.

If the coordinates of the image elements of the original image are designated at (x, y) with respect to the rotational center, the original image $P_1$ is transformed into an image $P_2$ if it is subjected to the following first skew transformation:

$$T_1 \times \begin{pmatrix} x \\ y \end{pmatrix} = \begin{pmatrix} 1 & -\tan\theta \\ 0 & 1 \end{pmatrix}.$$

In the subsequent scaling process, the image $P_2$ is subjected to the following process:

$$T_2 \times T_1 \times \begin{pmatrix} x \\ y \end{pmatrix}.$$

This means that the coordinates of the image elements of the image $P_2$ are multiplied by $\cos\theta$ in the direction of axis X and by $\sec\theta$ in the direction of axis Y. As a result of this process, an original image $P_3$ is produced. Moreover, the coordinates of the image $P_3$ are subjected to a second skew transformation. In other words, the coordinates of the image $P_3$ are multiplied by the matrix of $$T_3 = \begin{pmatrix} 1 & 0 \\ \tan\theta & 1 \end{pmatrix}.$$

As a result, it is possible to obtain the image which has been prepared by rotating the original image $P_1$ by the angle of $\theta$ radians on the center of the point O.

The principle of the present invention is carried out in fact by transforming the addresses of the image elements of the image memory, although it has been conceptionally explained hereinbefore. The rotated image is obtained by displaying the signals of that memory in a display or by recording the same signals on recording paper.

Figure 2:
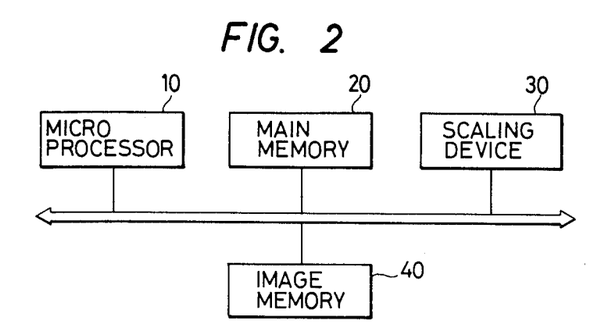
FIG. 2 is a diagram showing the hardware construction for executing the method according to one embodiment of the present invention.

FIG. 2 shows one example of the hardware construction for realizing the present invention. Reference numerals 10, 20, 30 and 40 appearing in FIG. 2 indicate a micro-processor, a main memory, a scaling device and an image memory, respectively. Here, for convenience of explanation, it is assumed that the digital image to be processed is represented by bi-level signals (i.e., the set of image elements having shading of white or black levels), but the present invention can also be applied to a multi-level image (i.e., the set of image elements having multiple gradient levels).

Figure 3:
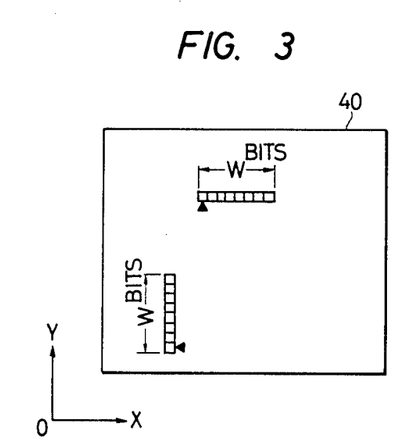
FIG. 3 is a diagram explaining the words construction of the image memory shown in FIG. 2.

The image memory has two-dimentional addresses for each image element, as shown in FIG. 3, to access the image data of W bits (i.e., one word), which are continuous in a longitudinal or transverse direction, in response to one read/write instruction. Solid triangles appearing in FIG. 3 indicate the positions of the leading bits of one word. An access mode is addressed in terms of a parameter t so that the W bits in the transverse direction are accessed for t=0; ans so that the W bits in the longitudinal direction are accessed for t=1. This method for realizing the image memory which can be two-dimentionally accessed is well known in the art and is detailed in another literature (e.g., IEEE, Trans on Computers, C-27, No. 2, pp. 113-125, February 1978) so that its explanation is omitted here.

Figure 4:
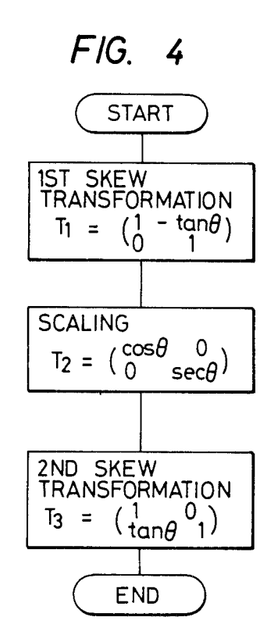
FIG. 4 is a flow chart showing the overall steps of the method according to the present invention.

The microprocessor 10 controls the operations of the individual units, and the programs and data required therefore are stored in the main memory 20. The processing procedures by the microprocessor 10 are illustrated in FIG. 4. In case the converted matrices are expressed by:

$$T_1 = \begin{pmatrix} 1 & -\tan\theta \\ 0 & 0 \end{pmatrix}, T_2 = \begin{pmatrix} \cos\theta & 0 \\ 0 & \sec\theta \end{pmatrix}, \text{ and } T_3 = \begin{pmatrix} 1 & 0 \\ \tan\theta & 1 \end{pmatrix},$$

(wherein: $-\pi/4 \leq \theta < \pi/4$, $3\pi/4 \leq \theta < \pi$, and $-\pi \leq \theta < -3\pi/4$), the processing contents will be described in the following (with reference to FIG. 5).

Figure 5:
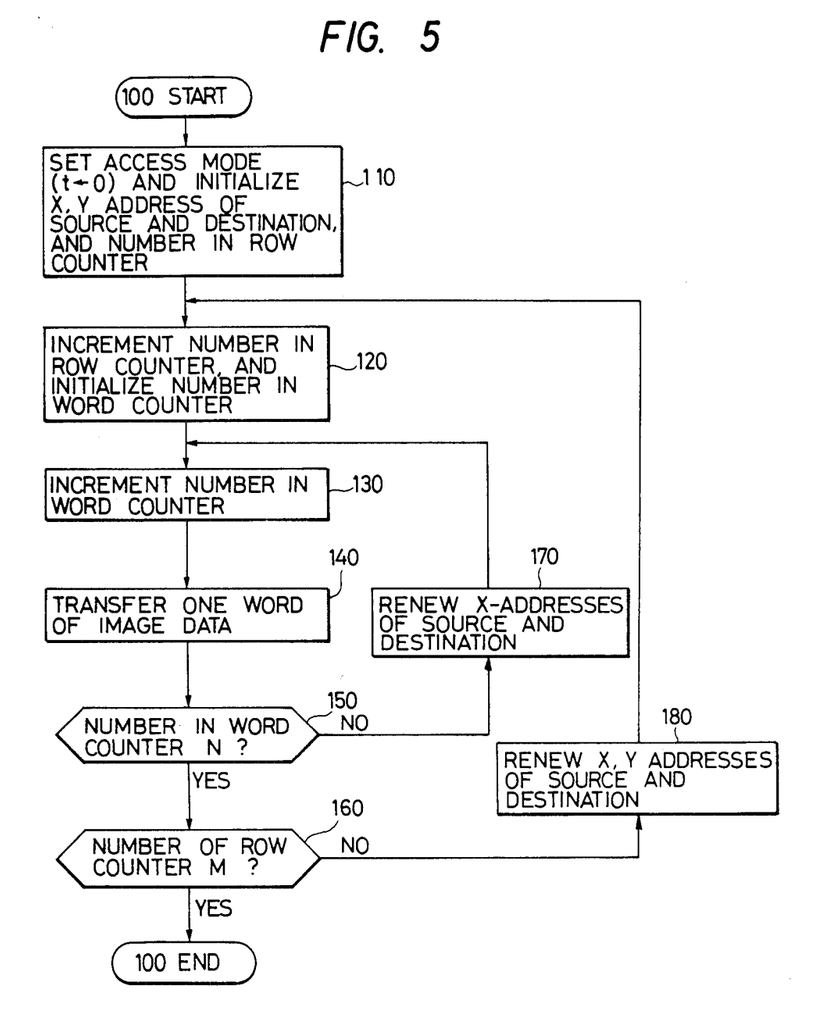
FIG. 5 is a flow chart representing one step of the method of the present invention for processing the skew transformation $T_1$.
Figure 6:
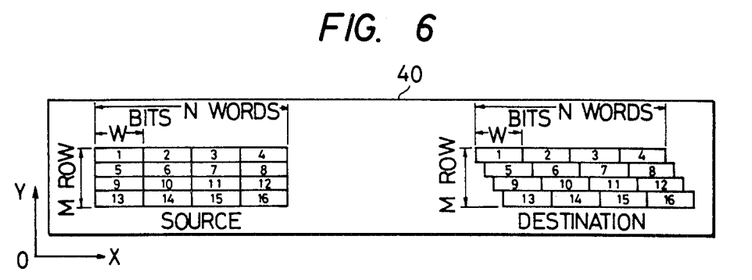
FIG. 6 is a diagram showing the layout of the data in the above skew transformation $T_1$.

(1) Process 100:

The original image data on the image memory is subjected to the skew transformation $T_1$. The detailed procedures are shown in FIG. 5. The contents of the skew transformation in the process 100 are shown in FIG. 6. As shown in FIG. 6, the original image data in the rectangular region of N words (width)×M columns (length) on the image memory are transferred word by word (i.e., the W bits) in the order of the numbers of FIG. 6. The top address of a source (i.e., original image data) is designated at $(\widehat{X}_1, \widehat{Y}_1)$, and the top address of a destination is designated at $(\widehat{X}_2, \widehat{Y}_2)$.

(a) Process 110:

The accesses of the W bits continuing in the transverse direction are addressed by setting the parameter t designating the access mode of the image memory at O. Moreover, the X address ($x_1$) and Y address ($y_1$) of a source, the X address ($x_2$) and Y address ($y_2$) of a destination, and a row counter (LC) are initialized. In short: $x_1 \leftarrow \widehat{X}_1$; $y_1 \leftarrow \widehat{Y}_1$; $\widehat{x}_2$; $\Delta x_2 \leftarrow 0$, $y_2 \leftarrow \widehat{Y}_2$; and LC$\leftarrow 0$.

(b) Process 120:

A number is incremented in the row counter (LC), and a word counter (WC) is initialized. In short: LC$\leftarrow$LC+1; and WC$\leftarrow 0$.

(c) Process 130:

A number is incremented in the word counter (WC). In short: WC$\leftarrow$WC+1. Here, the letters WC indicate a counter for the number of words transferred on said row of the image data.

(d) Process 140:

The image data of one word is transferred from the addresses ($x_1$, $y_1$) of the image memory to the address ($x_2$, $y_2$). Here, the addresses of the image memory are indicated by the position of the top bit (as indicated by the solid triangulars in FIG. 3) of said word. And, the access mode t=0.

(e) Process 150:

When the word counter (WC) has a number equal to N, all the words on said row of the image data are transferred. Therefore, the process proceeds to Process 160. In case the number in the word counter (WC) is smaller than N, the process proceeds to Process 170, in which the data transfer of said row is continued.

(f) Process 170:

The X address ($x_1$) of the source and the X address ($x_2$) of the destination are renewed in the following manners. In short: $x_1 \leftarrow x_1 + W$; and $x_2 \leftarrow x_2 + W$. After this renewal, the process is returned to Process 130.

(g) Process 160:

When the number of the row counter (LC) is equal to M, all the image data of the M rows x the N words have already been transferred. In this case, the process 100 is ended. In case the number of the LC is smaller than M, the process proceeds to Process 180:

(h) Process 180:

The X and Y addresses of the source and destination are renewed in the following manners. In short: $x_1 \leftarrow \widehat{X}_1$; $y_1 \leftarrow y_1 - 1$; $\Delta x_2 \leftarrow \Delta x_2 + \tan\theta$; $x_2 \leftarrow \widehat{X}_2 + [\Delta x_2]$; and $y_2 \leftarrow y_2 - 1$. Here, the symbol [ ] indicates a Gaussian one.

(2) Process 200:

The image data produced by the process 100 is enlarged or reduced in accordance with the converted matrix $T_2$. More specifically, the magnification in the transverse direction (i.e., in the direction of the axis x) is designated by $\alpha = \cos\theta$, and the magnification in the longitudinal direction (i.e., in the direction of the axis Y) is designated by $\beta = \sec\theta$. This enlarging/reducing process is conducted by the scaling device 30, and the processed result is stored in the image memory 40. The existing enlarging/reducing process can be used in the scaling device 30. The existing process takes a high speed in case it satisfies the Equation of the magnification=a constant integer/a variable integer. Now, let the case be considered as an example, in which the constant integer of the above equation is 32 and the angle of rotation $\theta$ is $\pi/4$. Then, the two magnifications $\alpha$ and $\beta$ are approximated, as follows: $\alpha = 1/\sqrt{2} \approx 32/45 \approx 0.711$; and $\beta = \sqrt{2} \approx 32/23 \approx 1.391$. In this example, the error of the magnifications by the approximations is about 1 to 2%, which is considered within a practically allowable range.

Figure 7:
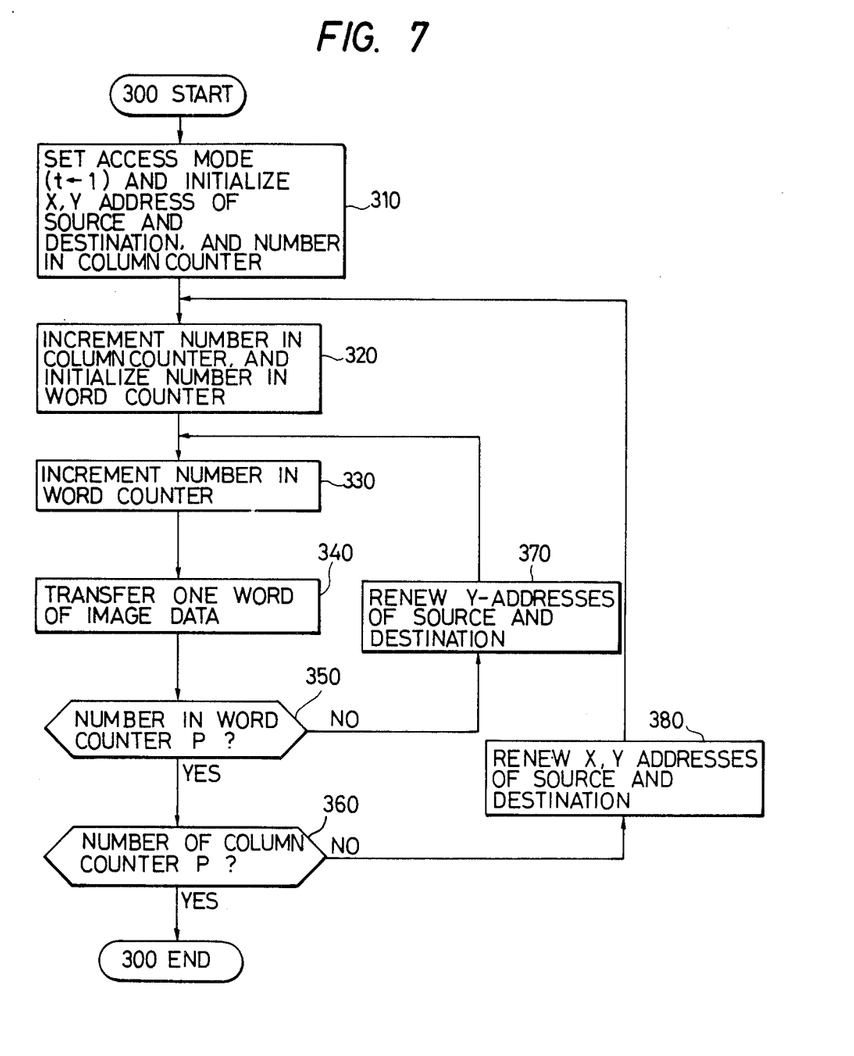
FIG. 7 is a flow chart representing another step of the method the present invention for processing the skew transformation $T_3$.
Figure 8:
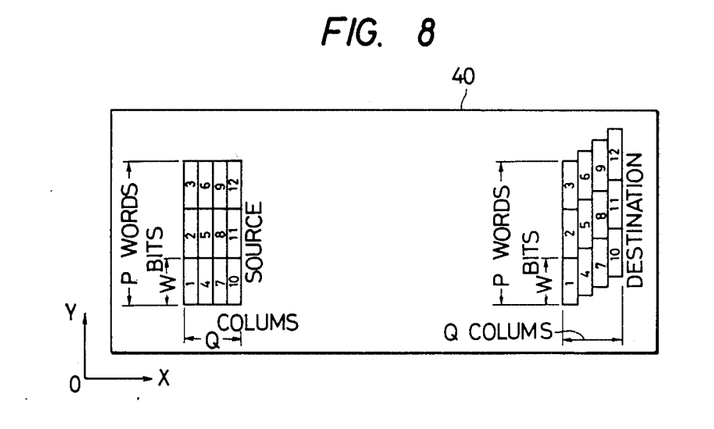
FIG. 8 is a diagram showing the layout of the data in the above skew transformation $T_3$.

(3) Process 300:

As a result of the process 200, the scaled image data is subjected to the skew transformation $T_3$. This procedure is shown in FIG. 7. The contents of the skew transformation of the process 300 are shown in FIG. 8. As shown in FIG. 8, the image data of the rectangular region, which is defined by Q rows (width)×P words (length) on the image memory are transferred by one word (i.e., the W bits) in the order of the numbers of FIG. 8. Here, the rectangular region of the Q rows x the P words is determined to include the image data after the enlargement/reduction by the process 200. Moreover, the access of the image memory is conducted by using the W bits continuing in the longitudinal direction as one word. Here, the top address of the source on the image memory is designated at $(\widehat{X}_1, \widehat{Y}_1)$, and the top address of the destination is designated at $(\widehat{X}_2, \widehat{Y}_2)$.

(a) Process 310:

By setting the parameter t indicating the access mode of the image memory at 1, the access of the W bits continuing in the longitudinal direction is addressed. Moreover, the X address ($x_1$) and Y address ($y_1$) of the source, and the X address ($x_2$) and Y address ($y_2$) of the destination, and the row counter (CC) are initialized. In short: $x_1 \leftarrow \widehat{X}_1$; $y_1 \leftarrow \widehat{Y}_1$; $x_2 \leftarrow \widehat{X}_2$; $y_2 \leftarrow \widehat{Y}_2$; CC$\leftarrow 0$; and $\Delta y_2 \leftarrow 0$.

(b) Process 320:

A number is incremented in the row counter (CC), and the word counter (WC) is initialized. In short: CC$\leftarrow$CC+1; and WC$\leftarrow 0$.

(c) Process 330:

A number is incremented in the word counter (WC). In short: WC←WC+1. Here, the letters WC indicate a counter for designating the number of the transferred words of said row of the image data.

(d) Process 340:

The image data of one word is transferred from the address ($x_1$, $y_1$) on the image memory to the address ($x_2$, $y_2$). Here, the addresses of the image memory are indicated by the position of the top bit (as shown by the solid triangles in FIG. 3) of said word. Moreover, the access mode t=1.

(e) Process 350:

When the word counter (WC) has a number equal to P, all the words on said row of the image data are transferred. Therefore, the process proceeds to Process 360. In case the number in the counter (WC) is smaller than P, the process proceeds to Process 370, in which the data transfer of said row is continued.

(f) Process 370:

The Y address ($y_1$) of the source and the Y address ($y_2$) of the destination are renewed in the following manner. In short: $y_1 \leftarrow y_1 + W$; and $y_2 \leftarrow y_2 + W$. After this renewal, the process is returned to 330.

(g) Process 360:

When the number of the column counter (CC) is equal to Q, all the image data of Q rows x P words has already been transferred. In this case, the process 300 is ended. In case the number of the CC is smaller than Q, the process proceeds to step 380.

(h) Process 380:

The X and Y addresses of the source and destination are renewed in the following manner. In short: $x_1 \leftarrow \overline{x_1} + 1$; $y_1 \leftarrow \overline{Y}_1$, $x_2 \leftarrow x_2 + 1$; $\Delta y_2 \leftarrow \Delta y_2 + \tan \theta$; and $y_2 \leftarrow \overline{Y}_2 + [\Delta y_2]$. Here, the symbol [ ] indicates a Gaussian one.

The processing procedures thus far described are directed to the image rotation in case the converted matrices are expressed by the following equations:

$$T_1 = \begin{pmatrix} 1 & -\tan\theta \\ 0 & 0 \end{pmatrix} ; T_2 = \begin{pmatrix} \cos\theta & 0 \\ 0 & \sec\theta \end{pmatrix} ; \text{and } T_3 = \begin{pmatrix} 1 & 0 \\ \tan\theta & 1 \end{pmatrix},$$

(wherein: $-\pi/4 \leq \theta < \pi/4$; $3\pi/4 \leq \theta < \pi$; and $-\pi \leq \theta < -3\pi/4$). In another case, in which the converted matrices are expressed by the following equations:

$$T_1 = \begin{pmatrix} \cot\theta & -1 \\ 1 & 0 \end{pmatrix} ; T_2 = \begin{pmatrix} \sin\theta & 0 \\ 0 & \text{cosec}\theta \end{pmatrix} ; \text{and}$$

$$T_3 = \begin{pmatrix} 1 & 0 \\ -\cot\theta & 1 \end{pmatrix},$$

(wherein: $\pi/4 \leq \theta < 3\pi/4$; and $-3\pi/4 \leq \theta < -\pi/4$), the processings are self-explanatory, and their explanations are omitted, because the rotation of the angle of $\pi/2$ may be added to the skew transformation, as is expressed by the converted matrix $T_1$.

In the embodiment thus far described, a simple processing method is exemplified merely for the convenience of explanation. In alternatives, the following various processing methods can be practised, as will be easily understood:

(1) In the processes 130, 140, 150 and 170 of FIG. 5, there is illustrated a method in which the data is transferred word by word on the image memory by programming the microprocessor 10. In order to speed up this method, it is possible to employ a method using DMA operation (i.e., Direct Memory Access). This DMA makes high-speed data transfer possible without any interposition of the microprocessor 10. The method of DMA is well known in the art so that its explanation is not made. Likewise, the processes 330, 340, 350 and 370 of FIG. 7 can also be replaced by the DMA transfer.

(2) FIG. 4 shows the method for realizing the image rotation at the three steps of the processes 100, 200 and 300. In an alternative method, the processes 100 and 200 and the processes 200 and 300 can be conducted in parallel so as to reduce the quantity of the image data to be transferred and to increase the speed.

(3) Although the foregoing embodiment is intended to process the image which is represented by bi-level signals, the principle of the present invention can be applied to a multi-level image or a color image.

(4) In the present embodiment, when the combination of the skew transformations and the enlargement/reduction is to be selected in accordance with the range of the rotational angle $\theta$, the region of the angle $\theta$ is equally divided by the integer times of the angle $\pi/4$. Despite this fact, the region of the angle $\theta$ can be divided by another method.

What is claimed is:

1. An image rotation processing method for transforming the address signals identifying the storage locations in memory where there are stored signals of an original image represented in two-dimensional orthogonal coordinates into the address signals of memory locations for storing signals of an image rotated by an angle $\theta$ (radians) with respect to said original image, comprising:

a first step of transforming the address signals of the memory storage locations of said original image into address signals of memory storage locations which are represented on skew coordinates making an intersectional angle $\theta$ (radians) with respect to one of said orthogonal coordinates;

a second step of conducting reduction of the transformed address signals substantially of cos $\theta$ in the direction of one axis of said orthogonal coordinates and enlargement substantially of sec $\theta$ (or cosec $\theta$) in the direction of the other axis; and a third step of transforming the reduced/enlarged address signals into address signals of memory storage locations which are represented on skew coordinates making an intersectional angle $\theta$ (radians) with respect to the other one of said orthogonal coordinates.

2. An image rotation processing method according to claim 1, further comprising:

a step of transferring image element signals from storage locations of said memory where the image elements of said original image are stored to storage locations of the memory identified by the first skewed address signals;

a step of transferring said transferred image element signals to storage locations of the memory identified by the reduced/enlarged address signals; and a step of transferring said transferred reduced/enlarged image element signals to storage locations of the memory identified by the second skewed address signals.

3. An image signal processing method for transforming the signals of an original image represented on two-dimentional orthogonal coordinates (x, y), into the signals of an image rotated by an angle $\theta$ (radians) with respect to said original image, comprising:
a first step of transferring the image signals of said original image stored in a first memory region of which the address of each image signal storage location corresponds to said two-dimensional orthogonal coordinates (x, y) into a second memory region in such a manner that each image signal stored in said second memory region is represented on skew coordinates making an intersectional angle $\theta$ (radians) with respect to one of said orthogonal coordinates (x or y);
a second step of scaling the address signals of said second memory region by use of a scaling device for conducting reduction substantially of cos $\theta$ (or sin $\theta$) in the direction of one axis of said orthogonal coordinates and enlargement substantially of sec $\theta$ (or cosec $\theta$) in the direction of the other axis and of storing the image signals into a third memory region at address locations based on the outputs of said scaling device; and
a third step of transferring the signal stored in the third memory region into a fourth memory region in such a manner that the address signals obtained by said second step are transformed into address signals represented on a skew coordinate making an intersectional angle $\theta$ (radians) with respect to the other one of said orthogonal coordinates (y or x).

4. An image signal processing method according to claim 3, wherein said angle $\theta$ is expressed by $(2n-1)\times\pi/4$ (wherein n: an integer defined by $1\leq n\leq 4$).

5. An image signal processing method according to claim 3, wherein a magnification of cos $\theta$, sin $\theta$, sec $\theta$ cosec $\theta$ of said scaling device is approximated by dividing a constant integer by a variable integer.

6. An image signal processing method according to claim 3, wherein address signals in the first, second and third steps are processed as digital data words each of which is associated with a plurality of image signal storage locations.

7. An image rotation processing method for converting the address signals identifying the storage locations in memory where there are stored signals of an original image represented in two-dimensional orthogonal coordinates into address signals of storage locations of image signals of an image which is rotated by an angle $\theta$ (radians) with respect to said original image, comprising:
a. a first step of conducting a matrix conversion of $$\begin{pmatrix} 1 & -\tan\theta \\ 0 & 1 \end{pmatrix} \times \begin{pmatrix} x \\ y \end{pmatrix}$$

to transform the address signals of the storage locations of the image elements of said original image into address signals identifying storage locations in memory which are on skew coordinates, wherein the coordinates of the image elements of said original image with respect to the center of rotation are represented by (x, y);
b. a second step of conducting a matrix conversion of $$\begin{pmatrix} \cos\theta & 0 \\ 0 & \sec\theta \end{pmatrix}$$

on said transformed address signals to produce scaled address signals of storage locations for a scale of the image whose address signals are transformed at the first step; and
c. a third step of conducting a matrix conversion of $$\begin{pmatrix} 1 & 0 \\ \tan\theta & 1 \end{pmatrix}$$

of said scaled address signals to transform the scaled address signals to converted address signals of storage locations for an image obtained which is rotated by an angle $\theta$ (radians) with respect to said original image.

8. An image rotation processing method according to claim 7, wherein said angle $\theta$ is expressed by $(2n-1)\times\pi/4$ (wherein n: an integer defined by $1\leq n\leq 4$).

* * * * *